(12) United States Patent
Creamer et al.

(10) Patent No.: US 7,490,326 B2
(45) Date of Patent: Feb. 10, 2009

(54) GATHERING OPERATIONAL METRICS WITHIN A GRID ENVIRONMENT USING GHOST AGENTS

(75) Inventors: Thomas E. Creamer, Boca Raton, FL (US); Bill H. Hilf, La Habra, CA (US); Neil A. Katz, Parkland, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 857 days.

(21) Appl. No.: 10/666,307

(22) Filed: Sep. 19, 2003

(65) Prior Publication Data

US 2005/0076191 A1 Apr. 7, 2005

(51) Int. Cl.
*G06F 9/46* (2006.01)
*G06F 9/44* (2006.01)
*G06F 11/00* (2006.01)
*G06F 19/00* (2006.01)

(52) U.S. Cl. .................. 718/100; 717/127; 714/33; 700/108

(58) Field of Classification Search .............. 709/202, 709/224; 718/100; 717/127; 714/33; 700/108
See application file for complete search history.

(56) References Cited

U.S. PATENT DOCUMENTS

| 5,592,609 | A | | 1/1997 | Suzuki et al. |
| 5,935,006 | A | | 8/1999 | Nakajima |
| 6,024,643 | A | | 2/2000 | Begis |
| 6,122,664 | A | * | 9/2000 | Boukobza et al. ........... 709/224 |
| 6,419,577 | B1 | | 7/2002 | Okada et al. |
| 6,681,243 | B1 | * | 1/2004 | Putzolu et al. ............... 709/202 |
| 2002/0002074 | A1 | | 1/2002 | White et al. |

OTHER PUBLICATIONS

Munehiro Fukuda; A Mobile-Agent Based PC Grid; Autonomic Computing Workshop; Jun. 25, 2003; IEEE.*
U.S. Appl. No. 10/665,582, filed Sep. 19, 2003, Creamer et al.
U.S. Appl. No. 10/666,309, filed Sep. 19, 2002, Creamer et al.
U.S. Appl. No. 10/665,585, filed Sep. 19, 2003, Creamer et al.

* cited by examiner

*Primary Examiner*—Meng-Ai An
*Assistant Examiner*—Eric C Wai
(74) *Attorney, Agent, or Firm*—Akerman Senterfitt

(57) ABSTRACT

A method for gathering operational metrics can include the step of identifying a host within a grid environment, wherein the host can be a software object. A ghost agent can be associated with the host. The ghost agent can replicate actions of the host. Operational metrics for at least a portion of the replicated actions can be determined. The operational metrics can be recorded. The host can move within the grid environment. The ghost agent can responsively move in accordance with movement of the host.

15 Claims, 6 Drawing Sheets

GATHERING OPERATIONAL METRICS WITHIN A GRID ENVIRONMENT USING GHOST AGENTS

BACKGROUND

1. Field of the Invention

The present invention relates to the field of computer software and, more particularly, to gathering operational metrics within a grid environment.

2. Description of the Related Art

A grid computing environment is a distributed computing environment where computing, application, storage, and/or network resources can be shared across geographically disperse organizations. An ideal grid computing environment allows flexible, secure, coordinated resource sharing among dynamic collections of individuals, organizations, and resources. In the grid environment, a variety of computing resources that contribute to a virtual resource pool can be transparently utilized on an as-needed basis. Grid computing resources in the virtual resource pool can be treated as commodities or services, which can be consumed in a manner similar to the commercial consumption of electricity and water.

While grid computing may presently be at an early stage in its evolution, several grid computing environments have been successfully implemented. One noteworthy implementation is the NC BioGrid Project that was successfully implemented in the fall of 2001 to enable researchers and educators throughout North Carolina to pool computing resources for use in sequencing genes and related genetic research. Other notable grid implementations include SETI@home, the Drug Design and Optimization Lab (D2OL), and EUROGRID. Additionally, commercially available software products exist for establishing a customizable grid computing environment, such as Avaki's data grid from Avaki of Burlington, Me. and Grid MP Enterprise from United Devices of Austin, Tex. Further, a number of readily available toolkits and standards have been developed for creating a grid computing environment including, for example, the Globus Toolkit provided by the Globus project and the Open Grid Services Architecture (OGSA).

A grid computing environment can include multiple application domains. Each application domain can include a set of computing resources that perform a series of related tasks. Examples of application domains include, but are not limited to, word processors, database programs, Web browsers, development tools, drawing applications, image editing programs, and communication programs. The various computing resources of one application domain can be distributed across several different grids within a grid computing environment, where each grid can contain a myriad of diverse hardware components, such as communication lines, networking routers, servers, workstations, peripherals, intranets, and the like.

The intermeshing of applications, users, and processes within the grid environment can make gathering operational metrics extremely difficult. That is, no simple method exists for determining resource consumption metrics for individual resource consumers that share a common pool of geographically disperse computing resources. As used herein, operational metrics refer to performance metrics and load metrics. Performance metrics include measurements of the time needed for individual transactions to be completed. Load metrics include measurements of the traffic within a hardware component and measurements of the capacity of hardware resources being consumed.

Many important operational issues, such as problem troubleshooting, grid planning, and software deployment, can require the gathering of operational metrics. Otherwise, the level of resources consumed by individual consumers cannot be accurately accessed resulting in potentially severe problems. Without proper operational metrics, the source causes of performance and load problems cannot be competently determined nor reliably avoided.

Conventional methods for gathering operational metrics involve extrapolation. Extrapolation methods attempt to determine operational metrics using small, finite, measurable increments of system resources. The measurable increments are applied to an extrapolation algorithm in order to determine the operational metrics of a grid, a user, and/or an application. The extrapolation methods are inadequate for accurately determining resource consumption on an individual consumer basis.

SUMMARY OF THE INVENTION

The invention disclosed herein provides a method, a system, and an apparatus for gathering operational metrics within a grid environment using ghosting agents, wherein operational metrics can refer to performance metrics and/or load metrics. More specifically, the present invention can associate ghosting agents to hosts, wherein a host is a software object. The ghost agent can record operational metrics relating to the actions performed by the host. These operational metrics can be used to determine the operational requirements for a user, a group of users, and/or an application. Additionally, ghost agents can be deployed into a test environment and used to gather operational metrics during tests.

While performing their respective operations, ghost agents and hosts can move throughout a grid environment. As used herein, movement in a grid environment refers to the movement from one grid component to another component within a grid and/or movement from one grid to a different grid of the grid environment.

One aspect of the present invention can include a method for gathering operational metrics that can include the step of identifying a host within a grid environment, wherein the host can be a software object. A ghost agent can be associated with the host. The ghost agent can also replicate actions of the host. Operational metrics for at least a portion of the replicated actions can be determined and can be subsequently recorded. Appreciably, operational metrics can include performance metrics and/or load metrics. Additionally, the host can move within the grid environment and the ghost agent can responsively move in accordance with movement of the host. Further, test input can be generated based in part upon the recorded operational metrics. A location that is external to the ghost agent can also be identified, wherein the recorded operational metrics can be conveyed to the identified location.

In one embodiment, a multitude of hosts can be selected. A ghost agent can be associated with each host. The ghost agents can replicate the actions of the respective hosts and record operational metrics relating to the replicated actions.

In another embodiment, the ghost agent can be deployed within a production segment of the grid environment. At least one additional ghost agent can be deployed within a test segment of the grid environment. Operational metrics relating to tests conducted within the test segment can be recorded using the deployed ghost agents.

Another aspect of the present invention can include a method for determining operational metrics. Operational metrics can include performance metrics and/or load metrics.

A transaction can be identified, wherein the transaction can include multiple actions. The actions can be executed within different locations of a grid environment. The different locations can exist within different grids of the grid environment. The actions can be replicated within at least one ghost agent. Data related to the replicated actions can be recorded. Operational metrics for the transaction can be determined based upon the recorded data.

Further, the actions can be executed within a production segment and/or a test segment of the grid environment. When the transaction is executed for an application within the production segment, operational metrics can be determined while actions for different applications are being executed within the production segment. When the transaction is executed for an application within the test segment, on the other hand, actions can be executed for at least one different application while conducting tests for the application in order to simulate system load resulting from the different applications.

Still another aspect of the present invention can include a ghost agent including a ghost log, a ghost controller, and a ghost identifier. The ghost agent can include a means for associating itself with a host. Additionally, the ghost agent can automatically move within a grid environment to follow movements of the host. The ghost log can record operational metrics relating to activities performed by the host. The ghost controller can manage interactions between the ghost agent and a grid environment. The ghost identifier can identify the ghost agent to components within the grid environment. The ghost agent can include a means for disassociating itself from the host. The ghost agent can also include a means for associating itself with a different host.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

The invention disclosed herein provides a method, a system, and an apparatus for gathering operational metrics within a grid environment. Operational metrics refer to performance and/or load metrics. The gathering of operational metrics involves the use of ghost agents. Ghost agents can be deployed within a grid environment to monitor selected hardware resources, applications, and users. For example, ghost agents can record the response times for performing user requests as well as the relative system loads experienced by various hardware components responding to the user requests. By using ghost agents, the operational metrics can be determined despite the fact that multiple different grid resources, which can be geographically dispersed throughout multiple grids, can be used in responding to the user requests. Further, the present invention can be used within a production segment of a grid environment as well as within a test environment of the grid environment.

As used herein, a ghost agent can be a self-managing, self-identifying software object capable of performing predefined tasks in a self-sufficient manner. Ghost agents can attach or bind themselves to a host in order to direct the activities occurring within the host to the ghost agent, thereby replicating the actions of the host. Any suitable technique can be used to attach the ghost agent to the host including, but not limited to, debugging attachment techniques, system calibration techniques, hardware performance testing techniques, and similar binding methodologies. Once replicated within the ghost agent, actions can be analyzed, decomposed, modified, and recorded without affecting the executed actions of the host. The ghost agent can also receive input from various system components and use this input in determining action response times and system loads.

Ghost agents can be used in either an active or a passive fashion. A ghost agent that does not have an operational effect upon the grid environment other than passively recording the actions of a host and/or recording the operational metrics relating to the host is referred to as a passive or "read-only" ghost agent. Another type of ghost agent, an active ghost agent, can perform actions that having an operational effect. For example, an active ghost agent can selectively prevent a host from performing one or more actions, can delay the actions of a host, can modify one or more host actions, and can initiate new actions. For example, in one embodiment, an active ghost agent can be used to prioritize a series of queued actions based upon the performance requirements of each of the queued actions.

Figure 1:
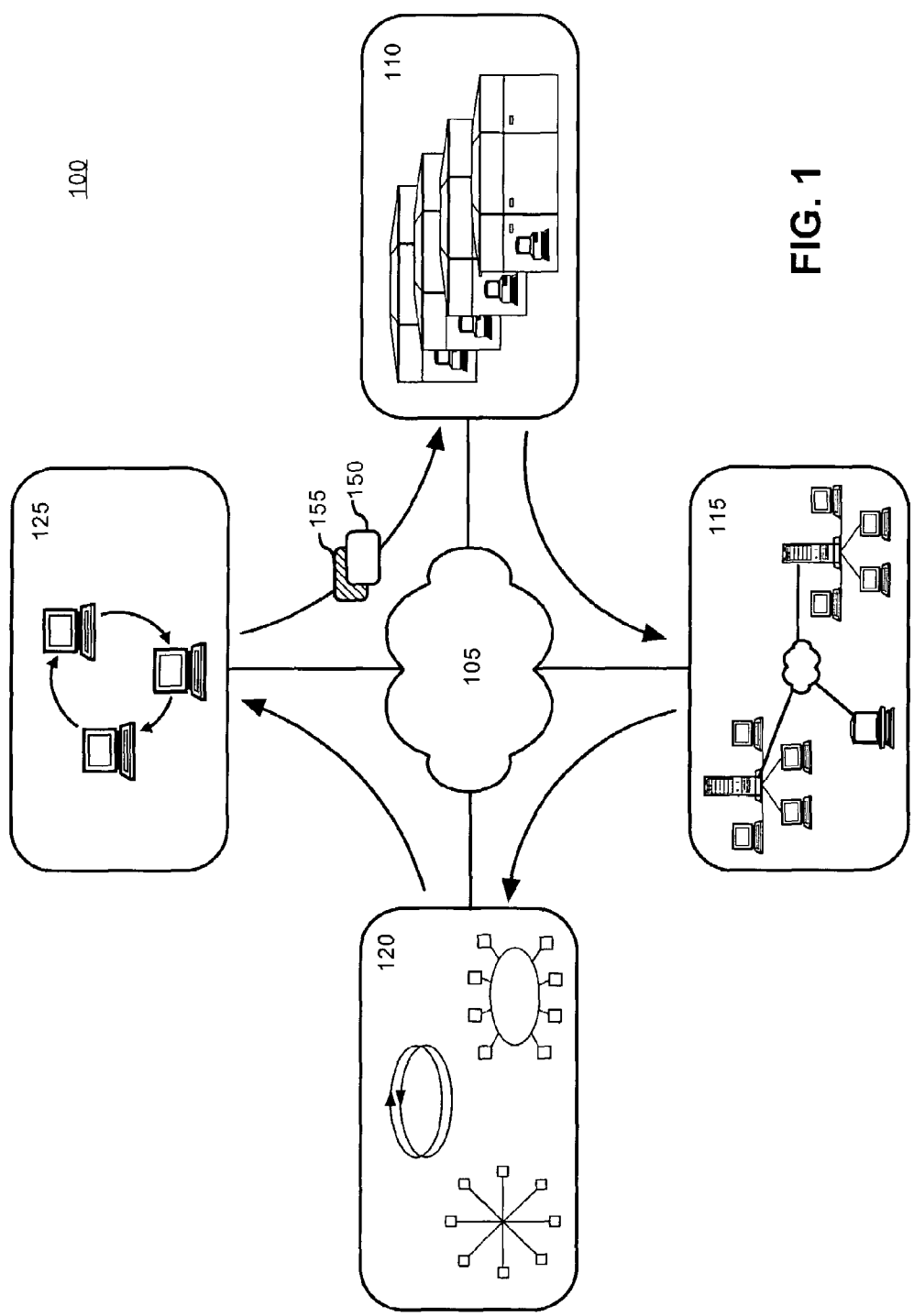
FIG. 1 is a schematic diagram illustrating an exemplary grid environment enabled for ghost agents and hosts.

FIG. 1 is a schematic diagram illustrating an exemplary grid environment 100 enabled for ghost agents and hosts. The grid environment 100 can be a distributed shared computing environment where a pool of computing resources are accessible on an as needed basis to a multitude of applications, users, and organizations. That is, within the grid computing environment 100 computing resources can be treated as commodities in a fashion similar to other consumer commodities, such as electricity and water.

As used herein, computing resources can include low-level and high-level resources as well as software and hardware resources. Low-level resources can include processing cycles of a CPU, storage space in a memory, capacity, bandwidth within a communication pathway, and other such hardware resources. Low-level resources can also include microcode routines, threads, CPU processes, and other such software resources. High-level hardware computing resources can include printers, fax machines, copiers, input devices, display devices, database storage space, removable media, and the like. High-level software resources can include algorithms and heuristics such as database search routines, spell-checking routines, transcription services, text-to-speech services, format conversions, and the like.

The grid environment 100 infrastructure can include components that utilize any hardware platform, operating system, storage scheme, and software resource. In order to be integrated within the grid environment 100, each computing component can be communicatively linked to the grid environment 100 through the network 105. Each computing component can also adhere to the standards and protocols defined within the architecture of the grid environment 100. The grid environment 100 can include one or more grids, such as grids 110, 115, 120, and 125, communicatively linked to one another through a network 105. Each grid can represent a grouping of physically differentiable hardware resources.

The grid 110 can include a multitude of mainframe or supercomputers. The grid 115 can include several local area networks, workgroups, and computing arrays. The grid 120 can include computing resources arranged according to any topography including, but not limited to, star topographies, Fiber Distributed Data Interface (FDDI) rings, token rings, and the like. The grid 125 can include one or more peer-to-peer networks. One of ordinary skill in the art can appreciate that the invention is not to be limited in this regard, that any hardware resources, topography, and software can be included in the grid environment 100, and that such arrangements are contemplated herein.

Host 150 can be a software object capable of moving within the grid environment 100. For example, the host 150 can move from grid 110 to grid 115 or from grid 120 to grid 125 to grid 115. The host 150 can also move from one location within a grid to another location. For example, the host 150 can move from one workgroup in grid 115 to a different workgroup in grid 115. Whenever the host 150 moves, the associated ghost agent 155 can move accordingly. As such, the ghost agent 155 can monitor the actions of the associated host 150 in a location independent fashion.

One illustrative example of ghost agents 155 operating within a grid environment 100 can relate to a Massive Multi-Player Gaming (MMPG) system. Each player of the MMPG system can be represented by a host 150 that responds to user instructions and interacts with the gaming environment. While playing the MMPG, players can move from one game play area to another, thereby moving the host 150 within the grid environment 100. Ghost agents 155 can be attached to selected players and can move within the grid environment 100 according to the movements of the host 150, which is the object representing the player.

For example, ghost agents 155 can be attached to a particular group of users, such as users having membership in a designated MMPG guild. Guild related behavior can then be examined and operational metrics can be determined for guild-specific actions. For example, the system load caused by guild-related components can be determined. Additionally, the system response times for performing various guild-related transactions can be determined.

In one embodiment, a new guild can be enabled within a production system for a very small set of test users in order to determine operational metrics for the new guild. Test input can then be constructed by combining the recorded operational metrics with the various actions performed by the test users. Active ghost agents utilizing this test input can be deployed in a test segment of the grid environment established for testing the MMPG. Other ghost agents can be deployed to record operational metrics for test. Accordingly, system requirements and performance specifications for the guild can be determined based on tests before the guild is fully enabled within a production version of the MMPG system. Of course, the above MMPG example is just one possible application within which ghost agents 155 can be utilized and the invention is not limited in this regard.

Figure 2:
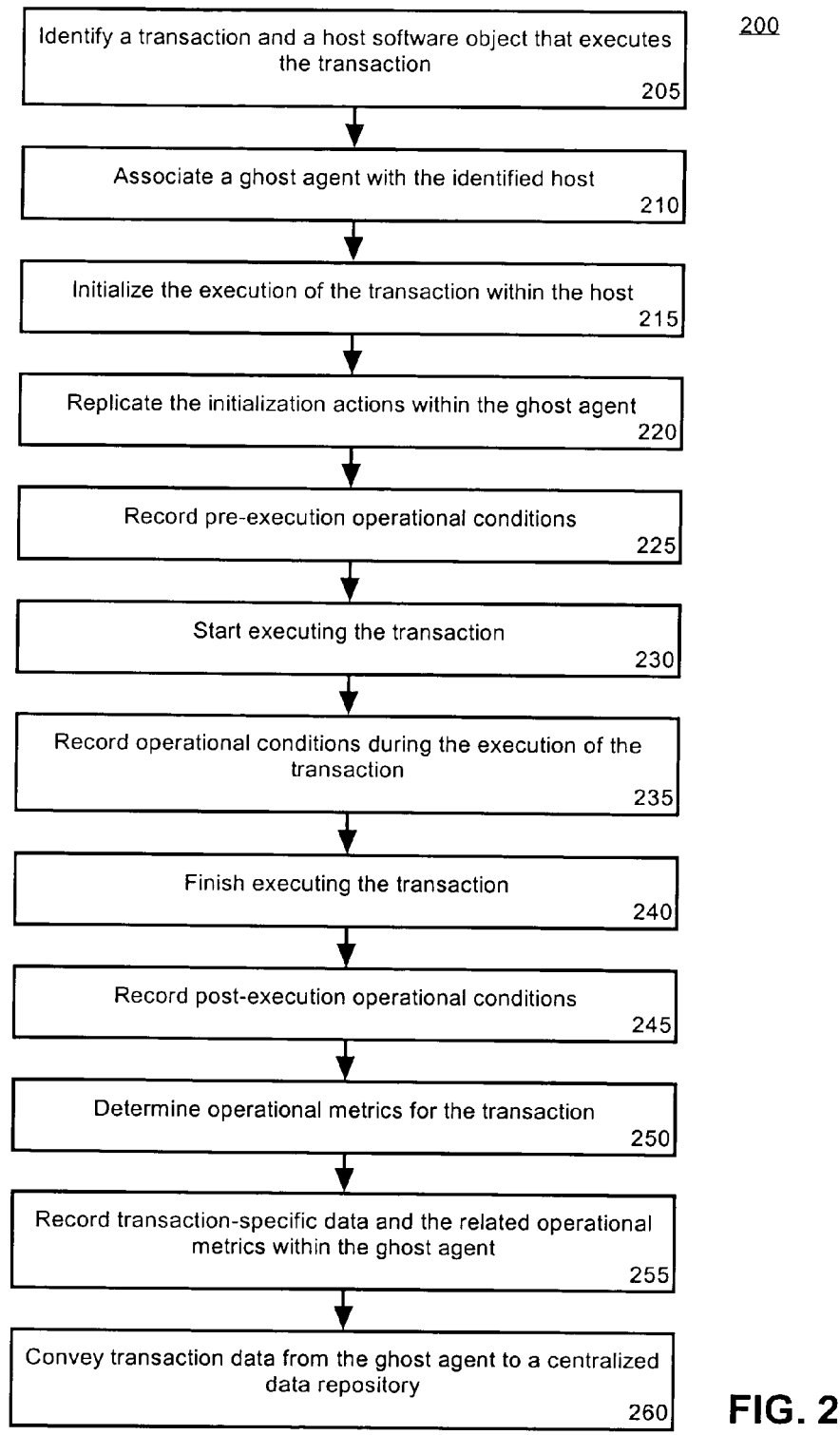
FIG. 2 is a flow chart illustrating a method for gathering operational metrics for a transaction using ghost agents in accordance with the inventive arrangements disclosed herein.

FIG. 2 is a flow chart illustrating a method 200 for gathering operational metrics for a transaction using ghost agents in accordance with the inventive arrangements disclosed herein.

The method 200 can be performed in the context of a computing grid environment where a common pool of computing resources can be utilized by consumers. Additionally, the transaction performed within method 200 can span multiple grids and components of the grid environment. Since individual components utilized for the transaction do not necessarily reside within a fixed hardware location, traditional logging and analysis methodologies cannot be easily implemented. Further complicating the environment and emphasizing the need for method 200, many different applications and/or users can commonly utilize the resource pool making performance and load determinations difficult.

The method 200 can begin in step 205, where a transaction can be identified. The transaction can be performed by a specified host, wherein a host is a software object as previously defined. In step 210, a ghost agent can be associated with the identified host. In step 215, the host can initialize the execution of the transaction. In step 220, the initialization actions performed by the host can be replicated within the ghost agent.

In step 225, the ghost agent can record pre-execution operational conditions. For example, the ghost agent can determine a pre-execution time. In another example, the ghost agent can determine the load on a specified grid component, before that component performs any actions relating to the transaction. In step 230, the execution of the transaction can begin. In step 235, the ghost agent can record operational conditions during the execution of the transaction. For example, the ghost agent can record the load placed on a system resource involved with the transaction. In step 240, the transaction can finish executing. In step 245, post execution operational conditions can be determined by the ghost agent.

In step 250, operational metrics can be determined for the transaction. The transaction operational metrics can include summary performance and load data for the entire transaction. If the transaction is composed of a series of discrete actions, the operational metrics can also include performance and load data for each of the discrete actions. In step 255, the ghost agent can record the transaction-specific operational metrics. In step 260, the recorded data can be conveyed from the ghost agent to a centralized data repository. The centralized data repository can store operational metrics gathered by one or more ghost agents. The centralized repository, for example, can be an operational metrics database searchable by user, user group, application, hardware resource, and the like.

Figure 3:
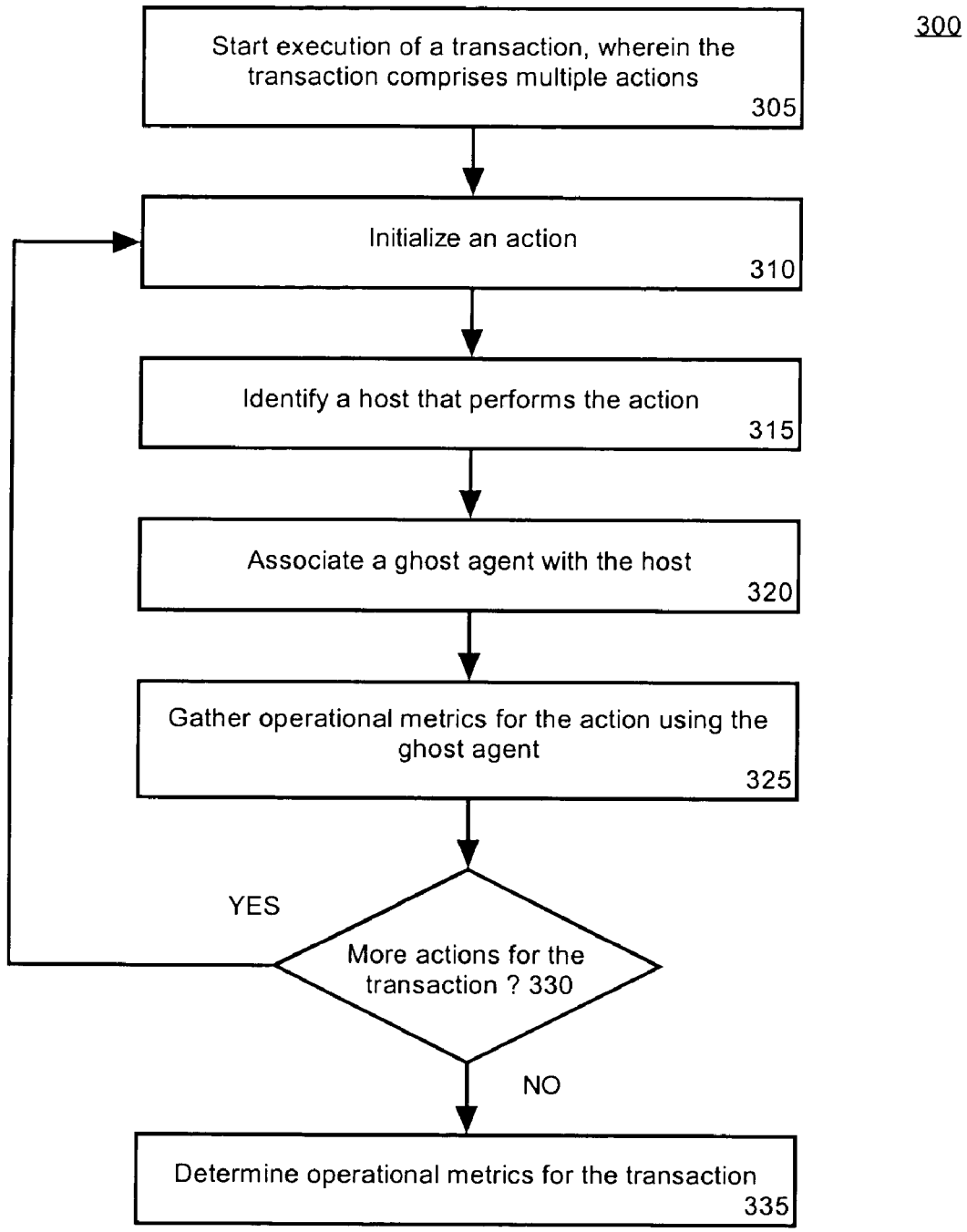
FIG. 3 is a flow chart illustrating a method for gathering operational metrics for a transaction comprising multiple actions in accordance with the inventive arrangements disclosed herein.

FIG. 3 is a flow chart illustrating a method 300 for gathering operational metrics for a transaction comprising multiple actions. The method 300 can be performed in a context similar to that previously described in FIG. 2. Method 300 can begin at step 305 when a transaction starts executing. The transaction can call one or more methods each of which can initialize a new actions. In step 310, an action can be initialized. It should be appreciated that actions spawned by the transaction can be executed in series and/or in parallel with one another. In step 315, a host can be identified that performs the action. In step 320, a ghost agent can be associated with the host. In step 325, the ghost agent can gather operational metrics for the action performed by the host. In step 330, if more actions exist for the transaction, the method can proceed to step 310, where the action is initialized. If no more actions exist for the transaction in step 330, the method can proceed to step 335. In step 335, operational metrics can be determined for the transaction. This determination can utilize the operational metrics gathered for the individual actions as well as transaction-specific operational metrics.

Figure 4:
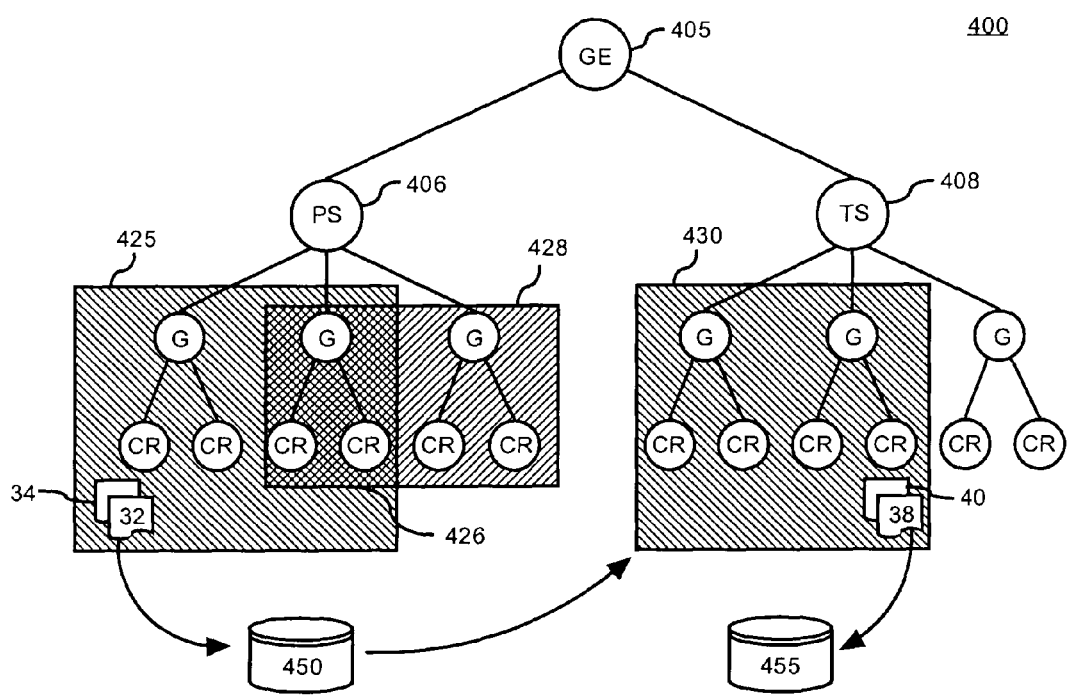
FIG. 4 is a schematic diagram illustrating a system in which operational metrics can be gathered using ghost agents in accordance with the inventive arrangements disclosed herein.

FIG. 4 is a schematic diagram illustrating a system 400 in which operational metrics can be gathered using ghost agents in accordance with the inventive arrangements disclosed herein. The system 400 illustrates that a grid environment 405 can include a production segment 406 and a test segment 408, represented by nodes "GE," "PS," and "TS" respectively. The production segment 406 can represent a partitioned segment of the grid environment reserved for operational purposes. The test segment 408, on the other hand, can represent a partitioned segment of the grid environment 405 reserved for testing purposes.

The production segment 406 and the test segment 408 can each include one or more different grids, each grid represented by a node labeled "G." Each grid can further provide one or more computing resources, represented by nodes labeled "CR." The computing resources can be pooled into the resource pool of the grid environment 405 and be utilized by various grid users on demand.

Application domains 425, 428, and 430 can exist within the grid environment 405, each functioning as a "virtual application" disposed within the grid environment 405. Unlike traditional applications that generally reside on a single server, application domains 425, 428, and 430 can physically span across several grids and grid components, yet logically function as a single application having a single user interface. Each application domain can utilize several different computing resources. Additionally, a set of computing resources can be utilized by more than one application domain. For example, application domain 425 and application domain 428 share a portion of computing resources labeled shared segment 426. Exemplary types of application domains 425, 428, and 430 can include productivity applications, entertainment applications, development applications, office applications, utility applications, multimedia applications, data management applications, graphic design applications, and the like.

Application domains 425 and 430 can utilize hosts 32 and 38 respectively while performing application-specific transactions. Ghost agent 34 can gather and record operational metrics relating to host 32 that executes actions within the production segment 406 for application domain 425. The recorded operational metrics can be recorded in application repository 450, which can be used to generate test input used within the test segment 408. Ghost agent 40 can gather and record operational metrics relating to the host 38 that executes actions within the test segment 408. The operational metrics gathered by ghost 40 can be conveyed to the test data store 455.

One of ordinary skill in the art should appreciate that the segmentation of the grid environment 405 need not occur within every embodiment of the present invention and that both operational behavior and test behavior can occur within a non-delineated grid environment 405. Further, when the grid environment is segmented, the segmentation of the grid environment 405 into the production segment 406 and the test segment 408 can occur in any of a variety of ways that include static and dynamic segmentation methods.

If segmented statically, a fixed portion of grid resources can be established for each segment. If segmented dynamically, the portion of grid resources established for each segment can vary over time and/or with system load. For example, during periods of increased grid activity, such as during a workday, a high resource percentage can be allocated for the production segment 406. This high resource percentage can be lowered during periods of lesser operational activity, thereby allowing a greater portion of resources to be dedicated towards the testing segment 408.

Figure 5:
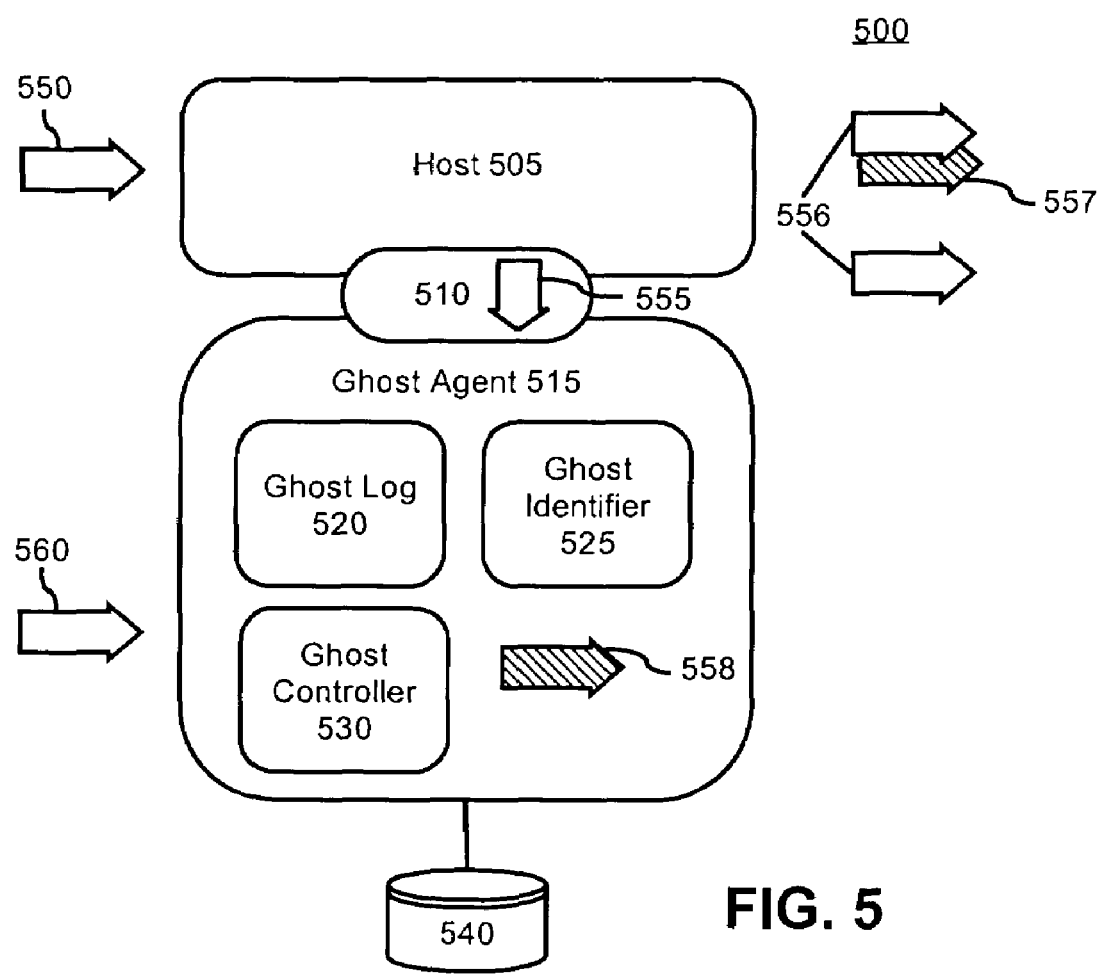
FIG. 5 is a schematic diagram illustrating a host and a ghost agent within a grid environment in accordance with the inventive arrangements described herein.

FIG. 5 is a schematic diagram illustrating a host 505 and a ghost agent 515 within a grid environment 500 in accordance with the inventive arrangements described herein. The host 505 can be any definable software unit within the grid environment 500 that can receive input 550 and execute actions 556. The input 550 can include messages of any type conveyed to the host 505, such as keyboard input, procedural calls, and the like. The actions 556 can be relatively high-level actions as well as low-level actions. High-level actions can include software routines that can contain one or more external procedural calls. Low-level actions can include hardware device calls and the execution of one or more processes or threads.

The ghost agent 515 can be associated or bound to the host 505 though the ghost interface 510. The ghost interface can generate replicated actions 555 that are copies of the actions executed by the host 505, using any of a variety of suitable techniques. For example, techniques used by software debugging programs to attach monitors to running programs in order to evaluate system behavior and step through code can be used by the ghost interface 510. Alternatively, techniques used by system calibration and hardware performance testing utilities can be used by the ghost interface 510 to bind the ghost agent 515 with the host 505. Further, operating system level commands, tools, and functions analogous or similar to the UNIX commands "strace" and "ptrace," can potentially be used by the ghost interface 510 to bind the host 505 with the ghost agent 515.

The ghost agent 515 can analyze and/or modify the replicated actions 555 and record data relating to the replicated actions 555. A replicated action 555 can be utilized by the ghost agent 515 as a passive action 558 or an active action 557. The passive action is a "read only" action that has no operational effect upon the grid environment 500. That is, the passive action 558 can be stored and not rebroadcast or sent into the grid environment 500 to be executed. An active action 557, on the other hand, is executed within the grid environment 500. That is, the active action 557 can be sent to a recipient or destination within the grid environment 500 to be executed.

The ghost agent 515 can include a ghost log 520, a ghost identifier 525, and a ghost controller 530. The ghost log 520 can record the data relating to the replicated actions 555, thereby creating a log. The ghost log 520 can be configured to record all activities relating to the associated host 505 or can be configured to record only selected activities. For example, in one embodiment, the ghost log 520 can record only activities considered errors, thereby generating an error log. In another example, the ghost log 520 can record a statistically relevant portion of actions, such as recording data relating to every fifth replicated action 555. The ghost log 520 can also capture system information and add annotations from this system information to the generated log.

For example, system clock information can be captured and used to annotate the time between receiving a replicated action 555 and the completion time for an associated active action 557. In another example, metadata information contained within message flows, such as input 550, action 556, and active action 557, can be recorded and/or utilized by the ghost log 520. Additionally, the ghost log 520 can time stamp data relating to replicated actions 555.

The ghost log 520 can also record the log information in a ghost log repository 540. The ghost log repository 540 can be a temporary buffer or a persistent data storage area. If the ghost log repository 540 is external to the ghost agent 515, any of a variety of different mechanisms can be utilized to convey the log data to the ghost log repository 540.

For example, an intermittent communication link, such as a unicast or a point-to-point communication link can be established between the ghost log 520 and the ghost log repository 540 through which data can be conveyed. In another example, a buffer space, which can be another embodiment of ghost log 520, within the ghost agent 515 can record log information. Whenever the buffer reaches a specified volume of data, a message containing the buffered information can be conveyed to the ghost log repository 540 and the buffer within the ghost agent 515 can be cleared and used to store fresh data.

In yet another example, ghost agents 515 can convey log data to a local data server. The local data server can then convey all received log data to the ghost log repository 540 from time to time or on a periodic basis. In still another example, the ghost agent 515 can intermittently deposit log data to a local location. Then a data-reaping object can gather packets of the log data that have been locally deposited by the various ghost agents 515. The packets of log data can be conveyed to the ghost log repository 540 by the data-reaping objects.

The ghost identifier 525 can provide identification, authorization, and security related functions for the ghost agent 515. That is, the ghost identifier 525 can identify the ghost agent 515 to the various components of the grid environment 500. Accordingly, servers in the grid environment 500 can have an awareness of the ghost agent 515. The grid servers can then use policy-based controls to manage permissions, authentication, resource utilization, and security for the ghost agents 515. Ghost agents 515 adhering to the established policies can be permitted to automatically enter and exit the various grids of the grid environment 500.

The ghost agent 515 can be granted different access privileges to computing resources as the ghost agent 515 traverses from one grid in a grid environment 500 to another depending on grid-based policies. Privileges afforded the ghost agent 515 can be determined any manner known in the art. For example, a ghost agent 515 can replicate the passwords provided by the host 505 and use the replicated passwords to provide authentication to the grid environment 500. In another example, before a ghost agent 515 can be permitted to follow an associated host 505 from one grid in the grid environment 500 to the next, a password or digital certificate unique to the ghost agent 515 can be required. The ghost agent 515 can receive the same system privilege level with the grid environment 500 as the host 505 or can receive a different privilege level.

The ghost controller 530 can manage the ghost agent 515. For example, the ghost controller 530 can establish a life span for a particular ghost agent 515 so that the ghost agent 515 self-terminates after a designated period. In another example, the ghost controller 530 can restrict the computing resources consumed by the ghost agent 515, thereby freeing up system resources in the grid environment 500 for improved operational performance. Alternately, the ghost controller 530 can increase the computing resources consumed by the ghost agent 515, thereby slowing down operational performance in the grid environment 500. Slowing performance can be beneficial when simulating a load during testing.

In one embodiment, the ghost controller 530 can accept control signals 560 from an external source. For example, the ghost controller 530 can receive control signals 560 causing the ghost agent 515 to alter previously designated behavior. Further, the ghost controller 530 can include a listener object capable of responding to particular events broadcasted by a corresponding notifier object. For example, a server could broadcast a signal causing all ghost controllers 530 to limit the resource consumption of all ghost agents 515 presently disposed in the server. Similarly, a grid wide broadcast could cause specified ghost agents 515 to self-terminate.

It should be noted that while ghost log repository 540 is depicted as being external and possibly remotely located from the ghost agent 515, it should be appreciated that the ghost log repository 540 can also be an allocated memory space internal to the ghost agent 515. For example, the ghost log repository 540 can be a dynamically allocated segment of random access memory (RAM) available to the ghost agent 515 as needed.

Figure 6:
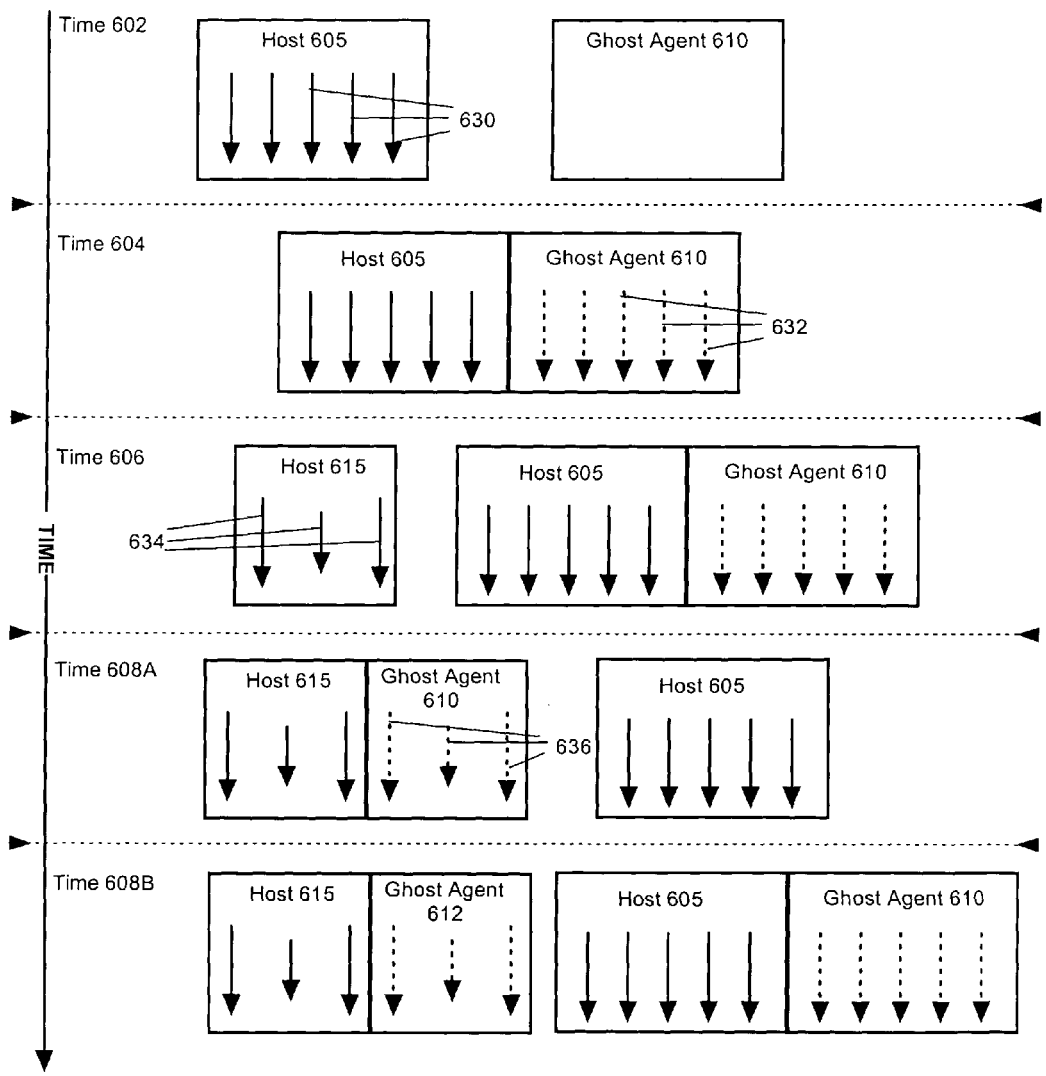
FIG. 6 is a schematic diagram illustrating the interaction between hosts and ghost agents over time in accordance with the inventive arrangements disclosed herein.

FIG. 6 is a schematic diagram illustrating the interaction between hosts and ghost agents over time in accordance with the inventive arrangements disclosed herein. The interaction can begin at time 602 with an unassociated ghost agent 610 and a host 605 executing host actions 630. At time 604, the ghost agent 610 can associate itself with the host 605. During this association process, each host action 630 within the host 605 can be replicated within the ghost agent 610 as a ghost action 632. Further, anytime a new action is initiated within the host 605, the new action can be replicated within the associated ghost agent 610.

Each ghost action 632 can be either a passive or an active action. For example, the host actions 630 can be executed within the grid environment while the ghost actions 632 can be passive actions that are operationally disabled. Passive actions are those actions that do not affect the operational behavior of the host software agent 605.

In another arrangement, the ghost actions 632 can be active actions affecting the operational performance of the environment and/or the associated host software agent 605. For instance, a ghost action 632 can consume limited computing resources thereby inducing a delay into the system and potentially slowing down system response time for the corresponding host 605. Delays induced by ghost actions 632 can be tailored by changing the execution details of the instruction set described within individual ghost actions 632.

For example, if a host action 630 invokes a portion of code such as an interactive process that cycles fifty times, the originally copied ghost action 632 can also cycle fifty times. The ghost agent 610 can increase the number of cycles in the iterative process to some number greater than fifty to slow down processing time and can decrease the cycles to a number less than fifty to speed up processing time.

At time 606, an interaction between host 605 and host 615 executing actions 634 can occur. This interaction can trigger either a transfer of the ghost agent 610 or a cloning of the ghost agent 610, wherein time 608A illustrates the results of an exemplary transfer action and time 608B illustrates the results of an exemplary cloning action.

At time 608A, the ghost agent 610 can be transferred from host 605 to host 615. For example, the ghost agent 610 can be first disassociated with host 605. The disassociation causes the ghost agent 610 to stop replicating actions of the host 605. Then the ghost agent 610 can be associated with host 615. During the association, the actions 634 can be replicated within ghost agent 610 resulting in ghost actions 636. Accordingly, the actions now recorded by the ghost agent 610 and placed within a ghost log repository are based upon host 615 and are not based upon host 605. In another example, the ghost agent 610 can be replicated and attached to the host software agent 615. Once replicated, the original ghost agent 610 associated with the host 605 can be deleted.

At time 608B, the ghost agent 610 can be cloned resulting in the creation of ghost agent 612, which is a copy of ghost agent 610. Ghost agent 612 is then associated with host 615. During the association, the actions 634 can be replicated 636 within ghost agent 612. Accordingly, the actions for both host 605 and host 615 can be recorded by respective ghost agents 610 and 612 and thereafter placed in the ghost log repository for logging purposes.

It should be noted that ghost agents 610 and 612 can be self-managing, self-identifying software objects capable of performing predefined tasks in a self-sufficient manner. For example, the ghost agents 610 and 612 can be programmed to seek a host of a specified type, to track a desired host from one grid location to another within a grid environment, to move from one grid in a grid environment to another, and/or to associate with hosts. In another example, the ghost agents 610 and 612 can be programmed to clone and attach themselves whenever a predetermined condition occurs, such as whenever a user object of a particular type is encountered.

The ghost agents 610 and 612 can also exchange information between themselves. For example, ghost agent 610 and ghost agent 612 can convey messages, records, and individual replicated actions to each other. Notably if ghost agent 610 and ghost agent 612 are disposed in different grids and if each was to move to the other's grid, the swapping of information between the two ghost agents 610 and 612 can be performed in lieu of moving each ghost agent.

In particular embodiments, each grid in a grid environment can contain a number of "blank" ghosts. "Movement" of a ghost from a first grid to a second grid can actually be performed by transferring the information from the "moving" ghost in the first grid to the "blank" ghost in the second grid. The "moving" ghost, now emptied of content, can be treated as a "blank" ghost for the first grid.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for gathering operational metrics within a grid environment comprising the steps of:
   identifying a host, wherein said host is a software object operating in a grid of said grid environment;
   associating a ghost agent within said grid with said host, wherein said ghost agent is configured to replicate and record at least one action of said host within said grid;
   determining operational metrics for at least a portion of said recorded at least one action;
   recording said operational metrics;
   moving said host from said grid to another grid within said grid environment; and,
   in response to said moving of said host, moving said ghost agent from said grid to said another grid in accordance with movement of said host.

2. The method of claim 1, wherein said operational metrics comprise performance metrics.

3. The method of claim 1, wherein said operational metrics comprise load metrics.

4. The method of claim 1, further comprising the steps of:
   identifying a location for logging data that is external to said ghost agent; and,
   conveying said recorded operational metrics to said identified location.

5. The method of claim 1, further comprising the step of:
   generating test input based in part upon said recorded operational metrics.

6. The method of claim 5, wherein said ghost agent is deployed within a production segment of said grid environment, said method further comprising the steps of:
   deploying at least one ghost agent within a test segment of said grid environment; and,
   recording operational metrics relating to tests conducted within said test segment using said deployed at least one ghost agent.

7. The method of claim 1, further comprising the steps of:
   selecting a plurality of hosts; and,
   for each selected host, repeating said associating step, said recording step, and said moving step.

8. A method for determining operational metrics within a grid environment comprising the steps of:
   identifying a transaction comprising a plurality of actions;
   executing said actions within different grids of said grid environment by at least one host;
   replicating said actions within at least one ghost agent;
   recording data relating to said replicated actions; and,
   determining operational metrics for said transaction based upon said recorded data,
   wherein said at least one host moves from one grid to another grid within said grid environment and in response to said moving of said at least one host, said at least one ghost agent moves from said one grid to said another grid in accordance with movement of said at least one host.

9. The method of claim 8, wherein said operational metrics comprise performance metrics.

10. The method of claim 8, wherein said operational metrics comprise load metrics.

11. The method of claim 8, wherein said different locations exist within different grids of said grid environment.

12. The method of claim 8, said executing step further comprising the step of:
    executing said actions within a production segment of said grid environment.

13. The method of claim 12, wherein said transaction is executed for an application, said determining step further comprising the step of:
    determining said operational metrics while actions for different applications are being executed within said production segment.

14. The method of claim 8, said executing step further comprising the step:
    executing said actions within a test segment of said grid environment.

15. The method of claim 14, wherein said transaction is executed for an application, said determining step further comprising the step of:
    executing actions for at least one different application to simulate system load resulting from said different applications.

* * * * *